United States Patent [19]

Monford, Jr.

[11] Patent Number: 5,061,112

[45] Date of Patent: Oct. 29, 1991

[54] METHOD AND APPARATUS FOR RELEASABLY CONNECTING FIRST AND SECOND OBJECTS

[75] Inventor: Leo G. Monford, Jr., Dickinson, Tex.

[73] Assignee: The United States of America as represented by the Administrator of the National Aeronautics and Space Administration, Washington, D.C.

[21] Appl. No.: 654,704

[22] Filed: Feb. 13, 1991

[51] Int. Cl.[5] ................................................. B25G 3/18
[52] U.S. Cl. .................................... 403/328; 411/348; 292/251.5; 403/DIG. 1
[58] Field of Search .......................... 403/328, DIG. 1; 24/303, 115 C, 136 A; 411/348; 292/251.5; 89/1.54, 1.58; 192/84 PM; 251/65; 70/276

[56] References Cited

U.S. PATENT DOCUMENTS

| 1,635,144 | 7/1927 | Stevens, Jr. | 403/328 X |
| 2,373,083 | 4/1945 | Brewster | 411/348 |
| 2,942,907 | 6/1960 | Nagel et al. | 292/251.5 |
| 3,069,191 | 12/1962 | DePew | 411/348 X |
| 3,431,002 | 3/1969 | Melgaard | 292/251.5 |
| 4,016,914 | 4/1977 | Zurko | 411/348 X |
| 4,453,449 | 6/1984 | Hollmann | 403/328 X |
| 4,620,428 | 11/1986 | Kopesky | 251/65 X |

Primary Examiner—Andrew V. Kundrat
Attorney, Agent, or Firm—Hardie R. Barr; Harold W. Adams; Edward K. Fein

[57] ABSTRACT

Apparatus and method for releasably connecting first and second objects, wherein a magnetic end effector may include at least one elongated pin member (10) a proximal end of which is connected to the first object (1) and the distal end of which may be inserted into a receiving portion (4) in the second object (2). Latch members (16) are carried by the pin member (10) for radial movement between retracted and expanded positions for releasing and locking, respectively, first and second objects (1, 2). A plunger member (20) carried by the pin member (11) is axially moveable between first and second positions. In the first plunger position, the latch members (16) are located in the expanded (locked) position and in the second plunger position the latch members (16) are released for movement to retracted or unlocked position. Magnetic end effector (30) is provided for releasable attachment to the first object (1) and for moving the plunger member (20) to the second position, thereby releasing the first object (1).

9 Claims, 3 Drawing Sheets

METHOD AND APPARATUS FOR RELEASABLY CONNECTING FIRST AND SECOND OBJECTS

ORIGIN OF THE INVENTION

The invention described herein was made by an employee of the United States Government and may be manufactured and used by or for the Government of the United States of America for governmental purposes without the payment of any royalties thereon or therefor.

TECHNICAL FIELD

The present invention pertains to apparatus for releasably connecting objects. Specifically, the present invention pertains to apparatus for releasably connecting objects utilizing magnetic means. While the apparatus of the present invention is suitable for a number of uses, it is particularly suitable for releasably connecting objects in remote environments such as space.

BACKGROUND ART

There are many devices for connecting one object to another. In one general class of connecting devices, a pin member, attached to one object, is provided for engaging a corresponding receiving means, e.g., hole, in another object. The pin member may be provided with latches of some type which are radially movable, relative to the axis of the pin member, from retracted positions in which the latch members would allow insertion and withdrawal of the pin member into and from the hole, and expanded positions in which the pin member would be locked in the hole, releasably connecting the first and second objects. Most devices of this general type are manually operable. Some such devices have been developed for operation in remote applications such as space and provided with motorized latches which allow remote operation. However, such motorized latches are relatively complex and costly. If such mechanisms do not provide for remote motorized operation, they may be designed for manual manipulation by occupants of a space vehicle, requiring extravehicular activity for manipulation thereof. Extra-vehicular activity is, of course, subject to certain risks. Whether such connecting devices are operated, in space, manually, or by motorized mechanisms, many improvements therein are needed.

STATEMENT OF THE INVENTION

In accordance with the present invention, method and apparatus are disclosed for releasably connecting first and second objects, particularly objects in space. In the preferred embodiment, the apparatus comprises at least one elongated pin member, a proximal end of which is attached to a first object and the distal end of which projects therefrom for axial insertion into a corresponding hole provided by the second object. Latch elements are carried by the pin member which are radially moveable, relative to the central axis of the pin member from retracted positions in which the latch elements would be totally encompassed by the perimeter of the hole, allowing insertion and withdrawal of the pin member, to expanded positions which would engage a surface surrounding the hole to prevent withdrawal of the pin member therefrom. A plunger member may be carried by the pin member for movement between a first position engaging and locking the latch elements in their expanded position and a second position permitting movement of the latch elements to the retracted position.

An end effector is provided which is engageable with the first object to effect movement of the plunger member from its first position to its second position, allowing release of the first object from the second object. In some embodiments, the effector means is magnetically engageable with the first object to force the plunger in a direction away from the effector means to its second position. In other embodiments, the plunger member is magnetically attractable by the effector means so that, upon engagement of the effector means with the first object, the plunger means is magnetically drawn by the effector means from the first position to its second position.

There are several unique features of the present invention. Most importantly, these features permit first and second releasably connected objects to be released by an end effector without motorized latches and without, in the case of space operations, extravehicular activity. Conversely, an object may be attached to another object, as well as, released by the end effector. The features provide apparatus which is especially compatible for telerobotic operation. Furthermore, the apparatus of the present invention is less costly and subject to less risk than releasable connecting apparatus of the prior art. Many other objects and advantages of the invention will be apparent from reading the description which follows in conjunction with the accompanying drawings.

BRIEF DESCRIPTION OF THE DRAWINGS

Details of the invention will be described in connection with the accompanying drawings in which.

DETAILED DESCRIPTION OF THE INVENTION

Figure 1:
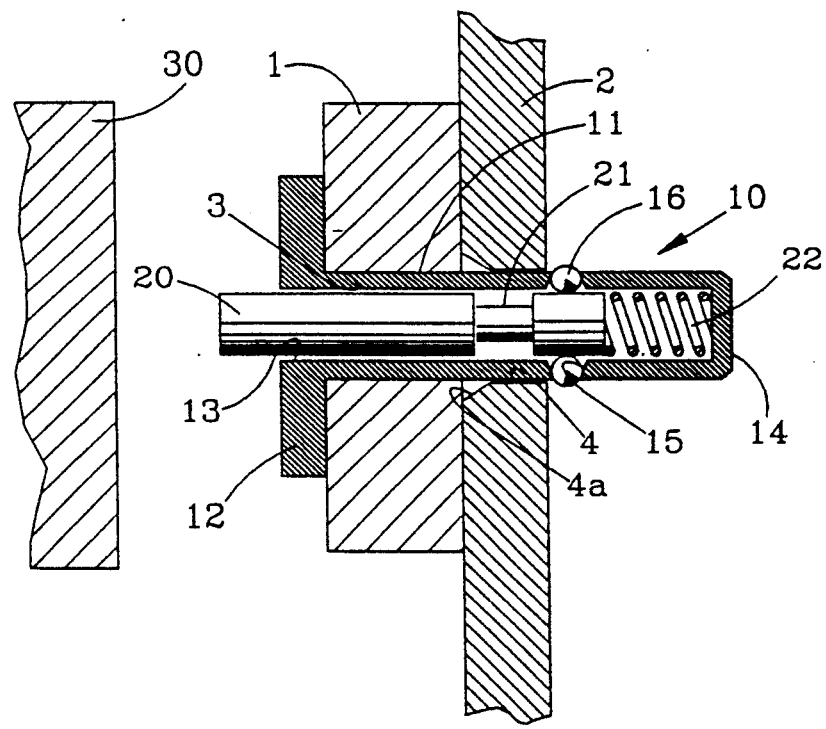
FIG. 1 is a longitudinal cross-sectional view of releasable connection apparatus according to a preferred embodiment of the invention, illustrating the connection of first and second objects thereby.
Figure 2:
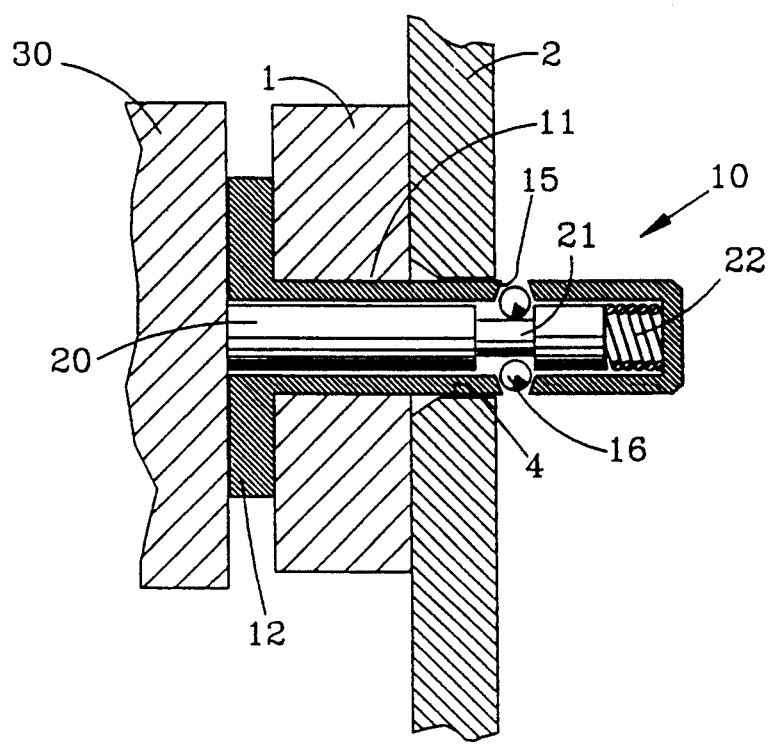
FIG. 2 is a longitudinal cross-sectional view of the releasable connection apparatus of FIG. 1, shown in a retracted or released position, with the first object being connected to the magnetic end effector while at the same time being released from the second object.

Referring first to FIGS. 1 and 2, there is shown first and second objects 1 and 2, respectively, releasably connected by connecting apparatus generally designated at 10. The first and second objects 1 and 2 could be almost any object. For example, the object 2 might represent the wall or housing of a space vehicle and the object 1 might represent some payload associated therewith. Or, the first object may be a tool 1 and the second object its carrier or mounting bracket 2. However, while the present invention was designed primarily for use in space, it could be utilized in almost any environment.

The connecting apparatus 10 may comprise a cylindrical pin member 11, a proximal end of which is attached to the first object 1 in any suitable manner. As illustrated, the proximal end of the pin member 11 is provided with plate or flange 12 which may be welded, bolted or fixedly attached in any other suitable manner to the object 1. A hole 3 through the object 1 may be provided to receive a portion of the pin member 11 in a fixed relationship therewith. The distal end of the pin member 11 projects from the object 1 for axial insertion through a corresponding hole 4 provided on the second object 2. The hole 4 may be flared or tapered as at 4a to provide a larger opening at the entrance to the hole 4. The pin member 11 may be tubular having a longitudinal bore 13 which may be open at the proximal end of the pin member 11 and closed at the distal end thereof providing a nose 14 which may be tapered if desired.

In the exemplary embodiment of FIGS. 1 and 2, a plurality of small radial holes 15 may be provided through the tubular walls of the pin member 11 to receive an equal number of ball-like latch members or elements 16. The radial holes 15 are tapered so that the diameter of these holes 15 decreases from the bore 13 to the outer surface of the pin member 11 from a diameter greater than the diameter of the ball latch members 16 to a diameter slightly less than the diameter of the ball members 16. Thus, the ball members 16, unless otherwise hindered, may move radially, relative to the central axis of the pin member 11, from a retracted position (See FIG. 2) in which the ball members 16 would be totally encompassed by the perimeter of the hole 4, to an expanded position (See FIG. 1) in which the ball members 16 project outwardly from the outer surface of the pin member 11. However, since the diameter of the holes 15 at the surface of the pin member 11 is less than the diameter of the ball members 16, the ball members 16 are limited in their radial outward movement. Carried in the bore 13 of the pin member 11, for axial movement therein, is a plunger member 20. In the embodiment of FIG. 1, the plunger member 20 has a reduced diameter or annular grooved area 21. One end of the plunger member 20 engages a spring member 22 biasing the plunger member 20 toward a first position (as shown in FIG. 1) in which a portion of the plunger member 20 projects out of the bore 13 (to the left as shown in FIG. 1). In the first position of FIG. 1, the diameter of the plunger member 20, at its right end, engages the ball members 16, in their radially expanded positions, preventing their retraction, thus preventing withdrawal of the pin member 11 from the hole 4, releasably connecting first and second objects 1 and 2.

If the plunger member 20 were moved against the biasing spring 22 to a second position, as illustrated in FIG. 2, the reduced diameter or grooved portion 21 of the plunger member 20 would be in registration with the ball members 16 allowing their movement to a retracted position (as illustrated in FIG. 2) which would release the pin member 11 for withdrawal from the hole 4, thus disconnecting object 1 and object 2. To move the plunger member 20 from the first or locked position of FIG. 2 to the second or released position of FIG. 2, there is provided a magnetic end effector 30. The magnetic end effector 30, in space applications, might be carried on a space vehicle of some type which could be guided toward the object 1 by a telerobotic operation such as the Space Shuttle Remote Manipulator System (RMS). In the embodiment of FIGS. 1 and 2, it is contemplated that the magnetic end effector, as directed toward object 1, would be magnetically attracted to object 1 or a suitable ferrous material attached thereto, such, as plate 12 so as to cause the magnetic end effector 30 to be magnetically engageable with the first object 1. As this occurs, of course, the end of the magnetic effector 30 would engage the projecting end of the plunger 20 (as positioned in FIG. 1) and, as the magnetic end effector 30 and object 1 are drawn together, would cause the plunger 20 to move from the first or locked position of FIG. 1 to the second or released position of FIG. 2. The magnetic end effector, thus, magnetically engages or attaches the object 1 (via plate 12, for example) at the same time object 1 is released from object 2. With the plunger 20 in the released position of FIG. 2, the ball members 16 would be allowed to move to the retracted positions allowing the pin member 11 to be withdrawn from the hole 4 for releasing the object 1 from the object 2. Obviously, reconnecting of object 1 and object 2 and releasing object 1 from the magnetic end effector would be done in the reverse manner.

A typical use of the invention would involve removal of a payload (or tool or other object) from its stowed position in the Space Shuttle Orbiter cargo bay. In such use the payload (object 1 in FIG. 1) would be removed from attachment to its carrier (object 2) in the cargo bay. Such attachment may be by means of apparatus 10. The RMS with magnetic end effector (such as, for example, that described in commonly owned patent application bearing U.S. Patent and Trademark Office Ser. No. 07-636,531 for "Electromagnetic Attachment Mechanism") may be used for this purpose. The magnetic end effector 30 would magnetically attach the RMS to the payload 1 while in its stowed position and attached to its carrier 2. It should be noted that it is of utmost importance to have the RMS attached to the payload 1 before the payload is released from its attachment to object 2. It is also important to effect a release of the payload from its stowed position with a minimum of time delay after it is attached to the RMS. The present invention effectuates such attachment and release virtually simultaneously.

Figure 3:
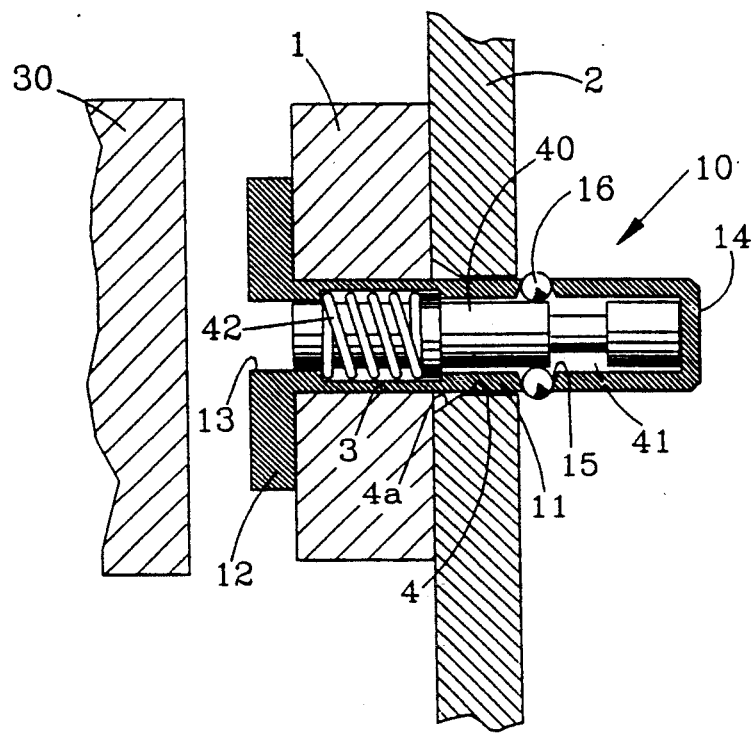
FIG. 3 is a longitudinal cross-sectional view of releasable connection apparatus, according to an alternate embodiment of the invention, releasably connecting first and second objects.
Figure 4:
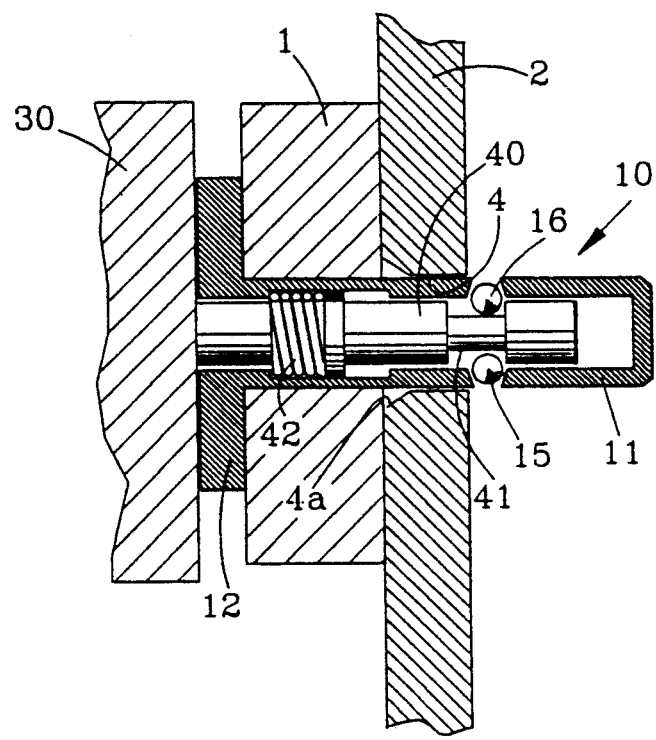
FIG. 4 is a longitudinal cross-sectional view of the releasable connection apparatus of FIG. 3, showing the apparatus in it retracted or released position.

An alternate embodiment of the invention is shown in FIGS. 3 and 4. In this embodiment, the apparatus releasably connects the same first and second objects 1 and 2 utilizing a pin member 11, ball latches 16 and other components very similar to the components of the apparatus of the embodiment of FIGS. 1 and 2. In fact, similar components are referred to in FIGS. 3 and 4 by the same numbers as similar components in FIGS. 1 and 2.

The major difference in the embodiment of FIGS. 3 and 4 is in the plunger member 40 and the operation thereof within the bore 13 of the pin member 11. In this embodiment, the plunger member 40 is also provided with a reduced diameter or grooved portion 41. However, contrary to the previously described embodiment, the reduced diameter portion 41, in the first or locked position, is to the right of the ball members 16 and the plunger member 40 does not project outwardly from the bore 13. In fact, it is slightly recessed therein. A spring 42 biases the plunger member 40 to the right (as viewed in FIG. 3) so as to bias the plunger 40 to the first or locked position in which the ball members 16 are in radially expanded positions locking the pin 11, and consequently object 1, in a fixed position relative to object 2.

To release the first object 1 from the second object 2 the magnetic end effector 30 is used. However, in this case, the plunger member 40 is made of a material which is magnetically attractable by the magnetic end effector means 30 so that upon engagement of the end effector 30 with the object 1 (or in this case the flange 12 of the pin member 11), the biasing spring 42 is overcome and the plunger member 40 moved to the second position, illustrated in FIG. 4, in which the reduced diameter portion 41 of the plunger member 40 is in registration with the ball members 16. This allows the ball members 16 to move to radially retracted positions, releasing the pin member 11 for withdrawal from hole 4. This in turn allows the first object 1 to be released from the second object 2.

Figure 5:
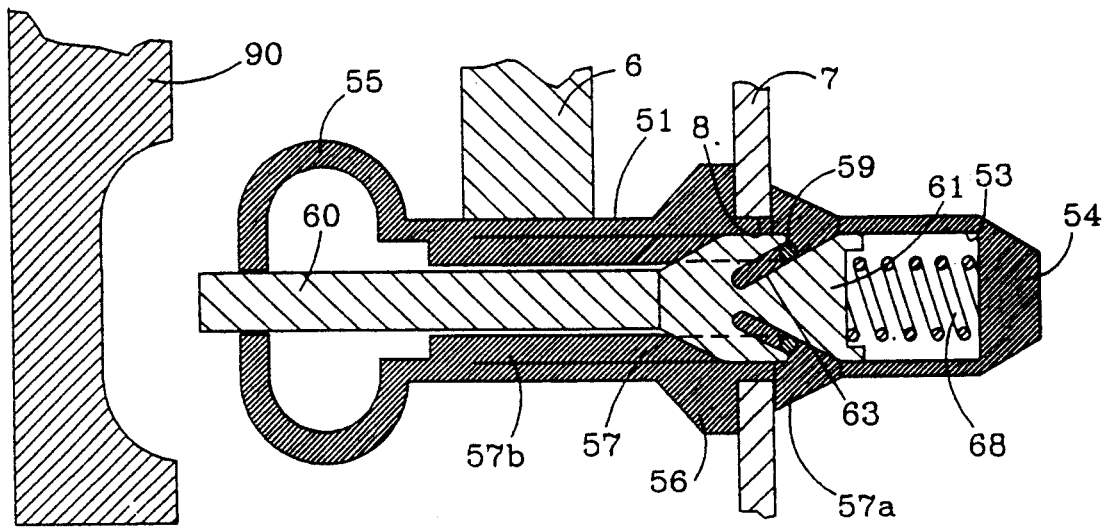
FIG. 5 is a longitudinal cross-sectional view of releasable connection apparatus, according to still another alternate embodiment of the invention, showing first and second objects releasably connected thereby.
Figure 6:
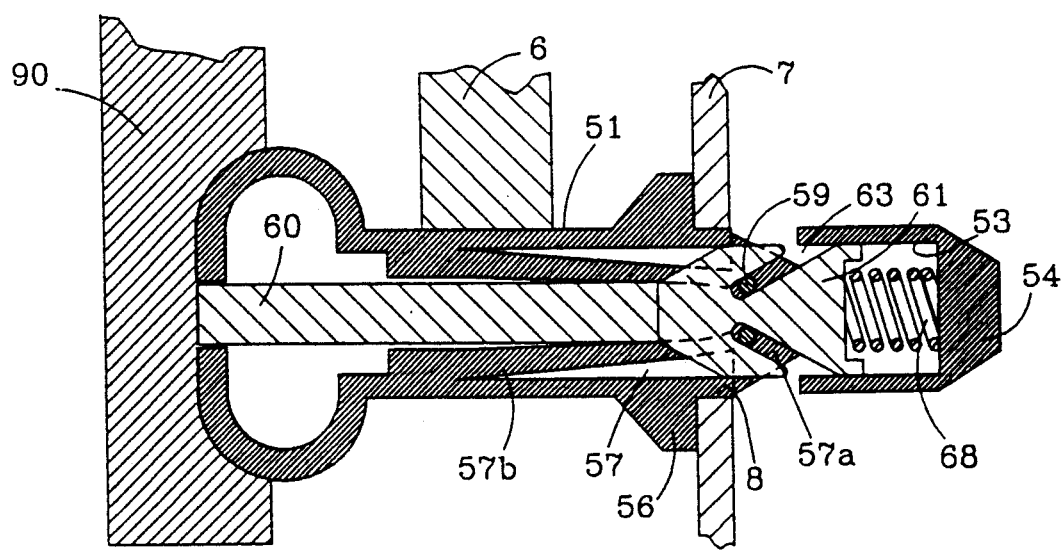
FIG. 6 is a longitudinal cross-sectional view of the releasable connecting apparatus of FIG. 5 showing the apparatus in its retracted or released position.

Referring now to FIGS. 5 and 6, there is shown still another embodiment of the invention using a slightly different type of latch mechanism. In this embodiment, one or more pin members 51 may be attached to a portion 6 of a first object for connection to a second object 7 by means of a one or more holes 8 provided therein. The pin member 51 is tubular, closed at the distal end by a tapered nose portion 54 and opening at the proximal end thereof through a bulbous or rounded portion 55. The tubular pin member 51 has a cylindrical bore in which is carried a plurality of latch members 57, comprising lugs or projections 57a which are mounted on elongated extensions 57b, which provide stability and orientation to the lugs 57a. The plunger member 60 has an enlarged head portion 61 which, in the embodiment of FIGS. 5 and 6, is provided with slots 63 which are engaged by correlative keys 59 provided with slots 63 which are engaged by correlative keys 59 provided on the latch lugs 57a. The slots 63 are inclined so that axial movement of the plunger member 60 will, through the engagement of keys 59 with the slots 63, cause radial expansion or retraction of the latches 57 depending upon direction of movement of the plunger member 60. In the first position of FIG. 5, the plunger member 60 is biased to the left by spring 68, partially projecting from the bulbous member 55 and forcing the latches 57 to the expanded or locked position shown therein. The biasing spring 68 resting between the bottom of the bore 53 and the end of plunger member 60 biases the plunger member 60 and the latches 57 toward the locked or engaged position with the latch lugs 57a projecting through corresponding apertures through the walls of pin member 51.

To release the pin member 51, and the object 6 to which it is attached from the second object 7, a magnetic service tool or end effector 90 may be directed, by remote means or any other suitable means, to a position in which the end effector 90 is magnetically attracted to the bulb 55. As the magnetic fields draw the magnetic end effector 90 and bulb 55 together, the end of the plunger member 60 is engaged and forced, against the biasing spring 69, toward a second position, as illustrated in FIG. 6. As this is done, the engagement of the keys 59 and slots 63 causes the latches 57 to be retracted or withdrawn into the apertures to a point which permits withdrawal of the pin 51 from the hole provided in object 7, releasing the first object 6 therefrom.

Thus, the present invention provides apparatus and method for effectively and releasably connecting a first object to a second object and for releasing the first object from the second object while simultaneously connecting the first object to a third object in which operation of the apparatus for releasing two objects is effected by magnetic means. This allows remote operation and is especially suitable for telerobotic operation in space. At least three embodiments of the invention have been described herein. However, many variations of the invention can be made without departing from the spirit of the invention. Accordingly, it is intended that the scope of the invention be limited only by the claims which follow.

I claim:

1. Apparatus for releasably connecting a first object to a second object, said apparatus comprising:
    at least one elongated pin member a proximal end of which is fixedly attached to said first object and the distal end of which projects therefrom for axial insertion into a corresponding hole provided on said second object, said pin member being tubular and having a longitudinal bore;
    latch means carried by said pin member radially movable, relative to the central axis of said pin member, from a retracted position in which said latch means would be totally encompassed by the perimeter of said hole, allowing insertion and withdrawal of said pin member into and from said hole, to an expanded position which, if said pin member has been previously inserted into said hole, would engage a surface surrounding said hole preventing withdrawal of said pin member from said hole;
    plunger means carried in the longitudinal bore of said pin member for coaxial reciprocal movement between a first and a second position, in said first position engaging and locking said latch means in said expanded position and in said second position permitting movement of said latch means to said retracted position; and
    magnetic end effector means engageable with said first object for effecting movement of said plunger means from said first position to said second position and allowing release of said first object from said second object, wherein,
    said latch means comprises a plurality of latch members, each of which are at least partially disposed in corresponding apertures through the tubular walls of said pin member, said latch members projecting radially out of said aperture when said plunger means is in said first position but being allowed to withdraw within said apertures when said plunger means is in said second position and, wherein further, at least one correlative key and slot for each of said latch members is provided, said key being provided on one of said latch members and said plunger member and said slot being provided on the other, relative movement of said key within said slot, in response to movement of said plunger members between said first and second position, effecting movement of said latch members between said radially projecting and said radially withdrawn dispositions.

2. A method for releasing first and second objects connected by apparatus which comprises: at least one elongated pin member a proximal end of which is fixedly attached to said first object and the distal end of which projects therefrom into a corresponding hole provided on said second object; latch means carried by said pin member radially movable, relative to the central axis of said pin member, from an expanded position engageable with a surface surrounding said hole preventing withdrawal of said pin member from said hole to a retracted position in which said latch means would be totally encompassed by the perimeter of said hole; allowing withdrawal of said pin member from said hole, and plunger means carried by said pin member and axially movable between a first position engaging and locking said latch means in said expanded position and a second position permitting movement of said latch means to said retracted position; said method including the step of moving magnetic end effector means into engagement with said first object to effect movement of said plunger means from said first position to said second position, to release said first object from said second object, wherein, said plunger member, when in said first position, projects for engagement by said magnetic end effector means as it moves into engagement with said first object to force said plunger means, in a direction away from said magnetic end effector means, from said first position to said second position to allow said release of said first object from said second object.

3. The method of claim 2 in which said magnetic end effector means is attached to a third object so that upon said release of said first object from said second object said first object is substantially simultaneously connected to said third object.

4. The method of claim 3 including the additional step of moving said third object and said first object connected thereto away from said second object.

5. The method of claim 4 including the additional steps of: returning said third object and said connected first object to said second object; engaging said pin member thereon with said hole on said second object; and releasing said magnetic end effector from said plunger means to allow said plunger means to return to said first position so that said second object is again connected to said first object.

6. A method of connecting, by latching means and magnetic effector means, first and second objects; the first object having a magnetically attractable mating surface; the latching means being fixed with respect to first object and being capable of both a latched and an unlatched configuration with respect to the second object; the latching means having a connecting portion capable of extending from a portion of the first object to a portion of the second object and also having a protruding portion extending beyond, and being biased outwardly from, first object when in the latched configuration; the latching means being in unlatched configuration when the protruding portion is depressed against the bias a sufficient distance inwardly toward the first object; the second object having a receiving portion adapted for receiving the connecting portion of latching means; the magnetic effector having an electromagnet, comprising the steps:

a) moving the magnetic effector into contact with the mating surface of the first object, thereby depressing protruding portion of latching means against the bias and placing latching means in the unlatched configuration;

b) activating electromagnet of magnetic effector which acts by magnetic force of attraction on the mating surface of first object to attach the first object to the magnetic end effector;

c) moving the magnetic end effector with attached first object so as to engage the connecting portion of latching means with the receiving portion of second object;

d) deactivating the electromagnet of magnetic end effector to detach first object from the magnetic end effector;

e) moving the magnetic end effector away from mating surface of first object sufficient distance to allow protruding portion of latching means to move with bias away from the mating surface and thus placing latching means in latched configuration with respect to second object.

7. The method of claim 6 wherein steps a) and b) are combined such that activating the electromagnet of magnetic end effector acts by magnetic force of attraction on the mating surface of first object to move the magnetic end effector and the mating surface of first object into mutual contact, thereby depressing protruding portion of latching means against the bias and placing latching means in the unlatched configuration as well as attaching the first object to the magnetic end effector.

8. A method of disconnecting, by latching means and magnetic effector means, a first from a second object; the first object having a magnetically attractable mating surface; the latching means being fixed with respect to first object and being capable of both a latched and an unlatched configuration with respect to second object; the latching means having a connecting portion capable of extending from a portion of first object to a portion of second object and also having a protruding portion extending beyond, and being biased outwardly from, first object when in the latched configuration; the latching means being in unlatched configuration when the protruding portion is depressed against the bias a sufficient distance inwardly toward the first object; the second object having a receiving portion adapted for receiving the connecting portion of latching means; the magnetic effector having an electromagnet, comprising the steps:

a) moving the magnetic effector into contact with the mating surface of the first object, thereby depressing protruding portion of latching means against the bias and placing latching means in the unlatched configuration;

b) activating electromagnet of magnetic effector which acts by magnetic force of attraction on the mating surface of first object to attach the first object to the magnetic effector;

c) moving the magnetic effector and attached first object away from second object thereby removing connecting portion of latching means from receiving portion of second object.

9. The method of claim 8 wherein steps a) and b) are combined such that activating the electromagnet of magnetic effector acts by magnetic force of attraction on the mating surface of first object to move the magnetic effector and the mating surface of the first object into mutual contact, thereby depressing protruding portion of latching means against the bias and placing latching means in the unlatched configuration as well as attaching the first object to the magnetic effector.

* * * * *